(12) United States Patent  
Kojima

(10) Patent No.: US 10,337,585 B2  
(45) Date of Patent: Jul. 2, 2019

(54) VIBRATION ISOLATION DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/515,253

(22) PCT Filed: Aug. 28, 2015

(86) PCT No.: PCT/JP2015/074509  
§ 371 (c)(1),  
(2) Date: Mar. 29, 2017

(87) PCT Pub. No.: WO2016/052035  
PCT Pub. Date: Apr. 7, 2016

(65) Prior Publication Data  
US 2017/0219046 A1    Aug. 3, 2017

(30) Foreign Application Priority Data  
Oct. 3, 2014    (JP) .................................. 2014-205041

(51) Int. Cl.  
*F16F 15/08* (2006.01)  
*B60K 5/12* (2006.01)  
(Continued)

(52) U.S. Cl.  
CPC ................ *F16F 15/08* (2013.01); *B60K 5/12* (2013.01); *F16F 1/36* (2013.01); *F16F 1/371* (2013.01);  
(Continued)

(58) Field of Classification Search  
CPC .... F16F 1/36; F16F 1/371; F16F 15/08; F16F 2230/007; F16F 3/0873; B60K 5/12; B60K 5/1208  
See application file for complete search history.

(56) References Cited

U.S. PATENT DOCUMENTS 3,955,808 A * 5/1976 Jorn ........................ B60G 15/08  
267/152  
6,349,918 B1 * 2/2002 Bunker ................ B60K 5/1208  
248/635

(Continued)

FOREIGN PATENT DOCUMENTS

CN         1849228 A      10/2006  
CN       102390395 A       3/2012  
(Continued)

OTHER PUBLICATIONS

Communication dated Nov. 7, 2017 from the European Patent Office in counterpart Application No. 15847110.2.  
(Continued)

*Primary Examiner* — Thomas W Irvin  
(74) *Attorney, Agent, or Firm* — Sughrue Mion, PLLC

(57) ABSTRACT

The vibration isolation device (10) includes a first mounting member (11) connected to one of a vibration generating portion and a vibration receiving portion, and a second mounting member (12) connected to the other thereof; and an elastic body (13) disposed between the mounting members. On either one of opposing surfaces (24, 25) that oppose each other, respectively on the first mounting member (11) and the second mounting member (12), a stopper elastic body (27) having a stopper surface (26) which faces the other of the opposing surfaces (24, 25) such as to be capable of coming into contact therewith, and a hollow portion (30) in which the stopper elastic body (27) is disposed, are provided. The stopper elastic body (27) is fitted into the (Continued)

hollow portion (30) such that, among the surfaces of the stopper elastic body (27), a counter-stopper surface (34) which faces the direction opposed to the stopper surface (26), is in a state of non-contact.

6 Claims, 7 Drawing Sheets

(51) Int. Cl.
*F16F 1/36* (2006.01)
*F16F 1/371* (2006.01)

(52) U.S. Cl.
CPC ....... *B60K 5/1208* (2013.01); *F16F 2230/007* (2013.01)

(56) References Cited

U.S. PATENT DOCUMENTS

| | | | |
|---|---|---|---|
| 8,479,899 B2* | 7/2013 | Ohtake | F16F 1/371 |
| | | | 188/129 |
| 9,145,046 B2* | 9/2015 | Okanaka | B60K 5/1208 |
| 9,926,999 B2* | 3/2018 | Kadowaki | B60K 5/1216 |
| 9,933,038 B2* | 4/2018 | Kojima | F16F 13/14 |
| 10,119,593 B2* | 11/2018 | Kojima | F16F 15/08 |
| 2007/0028473 A1 | 2/2007 | Graeve et al. | |
| 2008/0079205 A1* | 4/2008 | Hayashi | F16F 1/3828 |
| | | | 267/140.13 |
| 2008/0196987 A1* | 8/2008 | Niwa | F16F 1/3828 |
| | | | 188/379 |
| 2009/0079116 A1* | 3/2009 | Yoshii | B60K 5/1291 |
| | | | 267/140.13 |
| 2012/0175831 A1 | 7/2012 | Kieffer | |
| 2013/0313399 A1* | 11/2013 | Tsutsumi | F16F 13/10 |
| | | | 248/638 |
| 2014/0151946 A1 | 6/2014 | Yokawa et al. | |
| 2015/0129742 A1 | 5/2015 | Okanaka et al. | |
| 2016/0053848 A1* | 2/2016 | Nakamura | F16F 1/3842 |
| | | | 248/634 |
| 2017/0299013 A1* | 10/2017 | Kojima | F16F 15/08 |
| 2018/0257471 A1* | 9/2018 | Soma | B60K 5/1208 |

FOREIGN PATENT DOCUMENTS

| | | |
|---|---|---|
| CN | 102639898 A | 8/2012 |
| EP | 0 412 864 A1 | 2/1991 |
| EP | 1 983 211 A2 | 10/2008 |
| JP | 64-40734 A | 2/1989 |
| JP | 3-121330 A | 5/1991 |
| JP | 2013-019502 A | 1/2013 |
| JP | 2013-108555 A | 6/2013 |
| JP | 2014-088914 A | 5/2014 |
| WO | 02/25138 A1 | 3/2002 |
| WO | 2011/148575 A1 | 12/2011 |
| WO | 2012001906 A1 | 1/2012 |
| WO | 2014/050761 A1 | 4/2014 |

OTHER PUBLICATIONS

Communication dated Jul. 27, 2018 from the State Intellectual Property Office of the P.R.C. in counterpart application No. 201580052309.8.

* cited by examiner

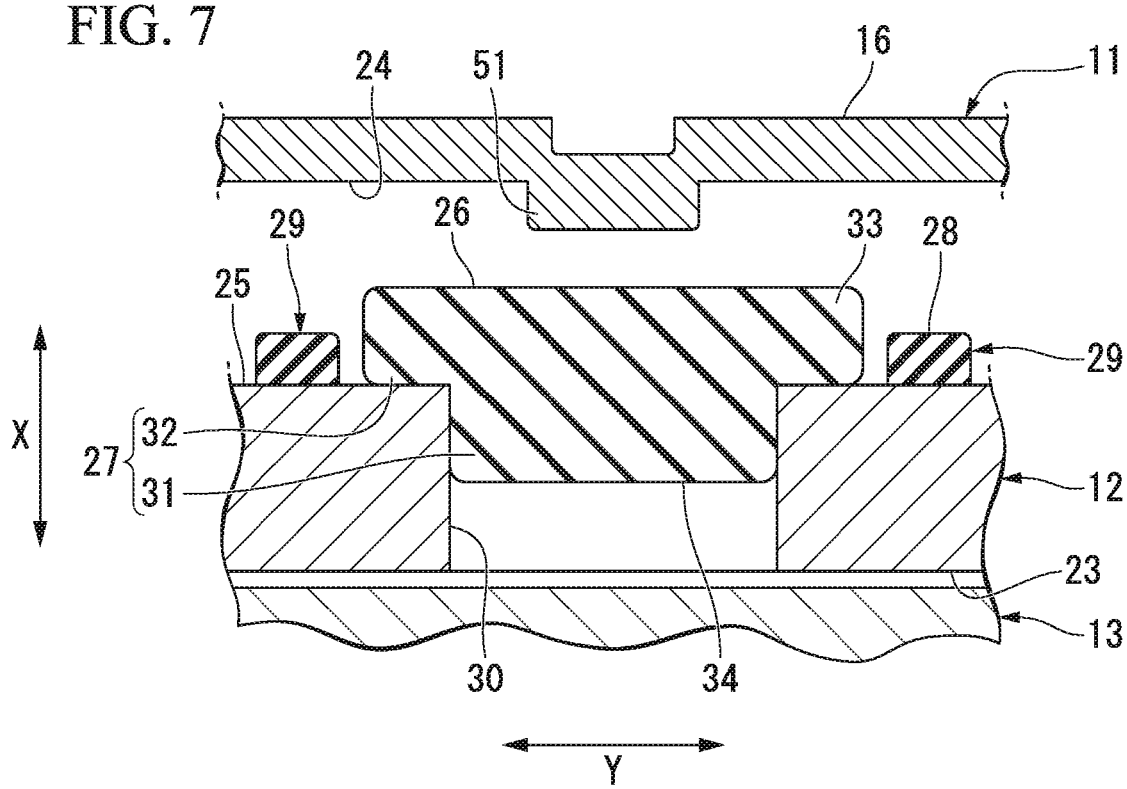
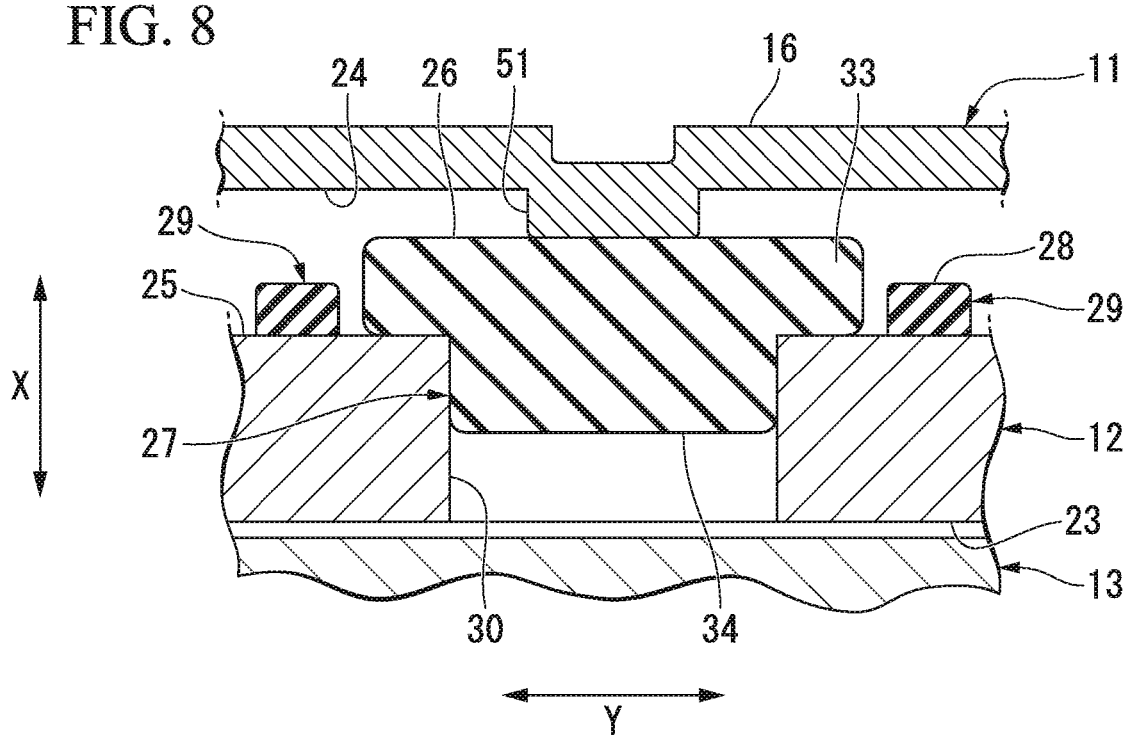

VIBRATION ISOLATION DEVICE

CROSS REFERENCE TO RELATED APPLICATIONS

This application is a National Stage of International Application No. PCT/JP2015/074509, filed on Aug. 28, 2015, which claims priority from Japanese Patent Application No. 2014-205041, filed on Oct. 3, 2014, the contents of all of which are incorporated herein by reference in their entirety.

TECHNICAL FIELD

The present invention relates to a vibration isolation device that is applied, for example, to automobiles, industrial machinery or the like, and that absorbs and dampens vibrations in vibration generating portions such as engines.

The present application claims priority on the basis of Japanese Patent Application No. 2014-205041, filed in Japan on Oct. 3, 2014, the content of which is incorporated herein by reference.

BACKGROUND ART

Conventionally, vibration isolation devices such as that described, for example, in the below-mentioned Patent Document 1 are known. This vibration isolation device comprises a first mounting member connected to one of a vibration generating portion and a vibration receiving portion, and a second mounting member connected to the other; an elastic body that is disposed between the mounting members; and a stopper elastic body having a stopper surface which is disposed on either one of opposing surfaces that oppose each other, respectively on the first mounting member and the second mounting member, and which faces the other surface so as to be capable of coming into contact therewith.

In this vibration isolation device, a load is applied in an opposition direction in which the opposing surfaces of the first mounting member and the second mounting member oppose each other, and the first mounting member and the second mounting member move relative to each other in the opposition direction. Then, the stopper surface of the stopper elastic body comes into contact with the opposing surface opposing the stopper surface, and relative movement between the mounting members is restricted.

RELATED DOCUMENT

Patent Document

[Patent Document 1]
Japanese Patent Application, First publication No. 2013-108555

SUMMARY OF INVENTION

Technical Problem

However, the aforementioned conventional vibration isolation device has a problem in that, when a stopper surface comes into contact with the opposing surface opposing the stopper surface, the spring constant in the opposition direction tends to suddenly increase.

The present invention was made in consideration of the aforementioned circumstances, and has the purpose of offering a vibration isolation device in which sudden increases in the spring constant can be suppressed.

Solution to Problem

In order to solve the aforementioned problem, the present invention proposes the following means.

The vibration isolation device according to the present invention comprises a first mounting member connected to one of a vibration generating portion and a vibration receiving portion, and a second mounting member connected to the other thereof; and an elastic body disposed between the mounting members. On either one of opposing surfaces that oppose each other, respectively on the first mounting member and the second mounting member, a stopper elastic body having a stopper surface which faces the other of the opposing surfaces such as to be capable of coming into contact therewith, and a hollow portion in which the stopper elastic body is disposed, are provided. The stopper elastic body is fitted into the hollow portion such that, among the surfaces of the stopper elastic body, a counter-stopper surface which faces the direction opposed to the stopper surface, is in a state of non-contact.

Advantageous Effects of Invention

According to the present invention, sudden increases in the spring constant can be suppressed.

BRIEF DESCRIPTION OF DRAWINGS

FIG. 7 is a section view of an essential portion of the vibration isolation device according to a second modification example of the present invention.

FIG. 8 is a section view of an essential portion of the vibration isolation device shown in FIG. 7, showing a state wherein vibrations are applied in a front-rear direction.

DESCRIPTION OF EMBODIMENTS

Hereinafter, a vibration isolation device 10 according to a first embodiment of the present invention will be explained with reference to FIG. 1 to FIG. 4.

Figure 1:
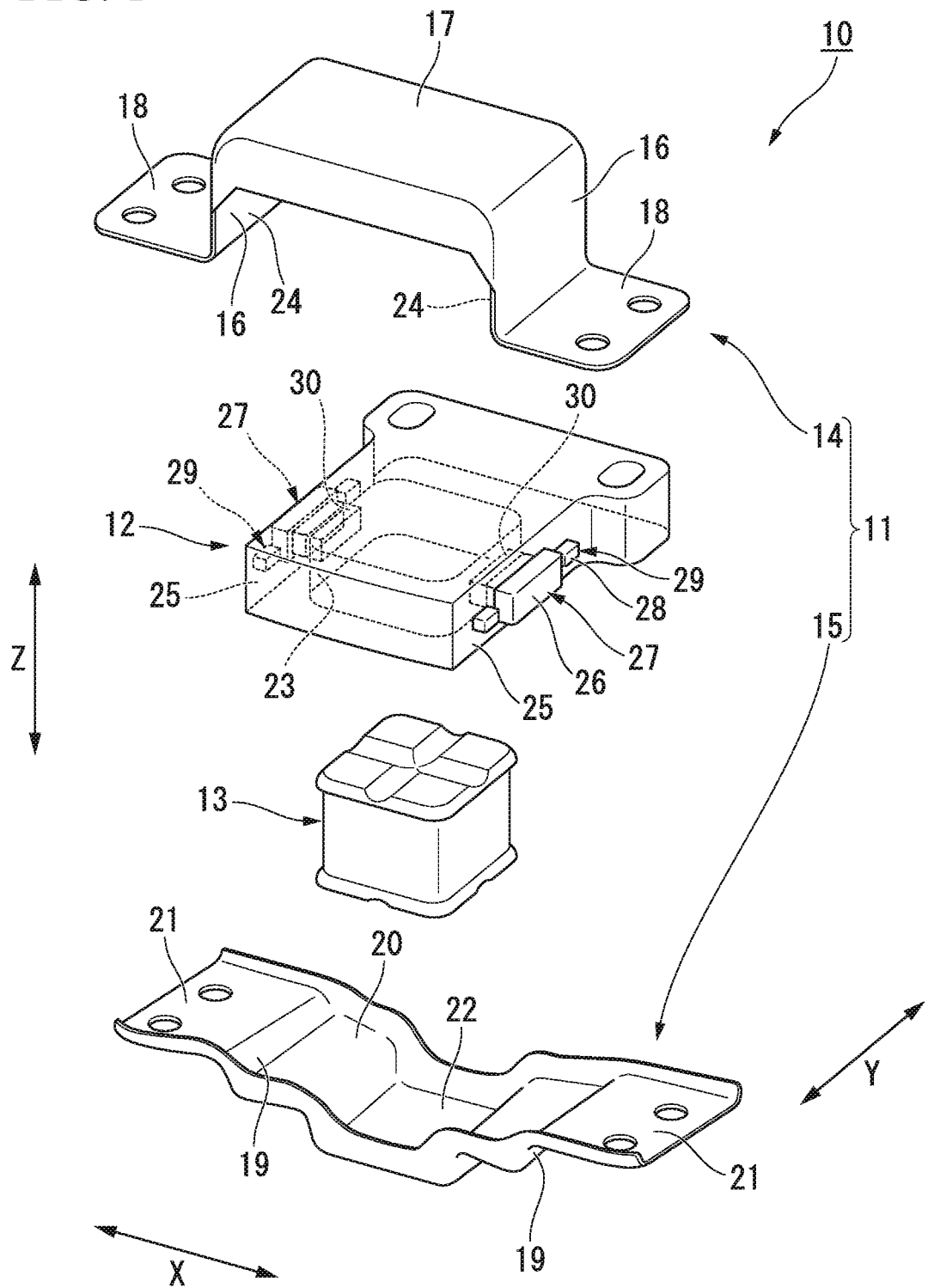
FIG. 1 is an exploded perspective view of a vibration isolation device according to an embodiment of the present invention.

As shown in FIG. 1, the vibration isolation device 10 comprises a first mounting member 11 connected to one of a vibration generating portion and a vibration receiving portion, and a second mounting member 12 connected to the other; and an elastic body 13 disposed between the mounting members 11 and 12.

The first mounting member 11 is formed in the shape of a tube, and the second mounting member 12 and the elastic body 13 are provided on the inside of the first mounting member 11. The elastic body 13 is sandwiched between the first mounting member 11 and the second mounting member 12.

Hereinafter, the direction in which the first mounting member 11 and the second mounting member 12 sandwich the elastic body 13 will be referred to as the up-down direction Z, and in the horizontal directions orthogonal to the up-down direction Z, the direction in which opening portions of the tubular first mounting member 11 open will be referred to as the left-right direction Y. Furthermore, the direction orthogonal to both the up-down direction Z and the left-right direction Y shall be referred to as the front-rear direction X.

The first mounting member 11 comprises an upper member 14 positioned on an upper side, and a lower member 15 positioned on a lower side. The first mounting member 11 is formed in the shape of a tube that opens in the left-right direction Y, by assembling the upper member 14 and the lower member 15 in the up-down direction. The opening portions of the first mounting member 11 have a rectangular shape when viewed from the left-right direction Y.

The upper member 14 comprises a front and rear pair of first side walls 16, a top wall 17 connecting the upper ends of these first side walls 16 with each other, and first flange portions 18 separately protruding, to the outside in the front-rear direction X, from the lower ends of the pair of first side walls 16. The lower member 15 comprises a front and rear pair of second side walls 19, a bottom wall 20 connecting the lower ends of these second side walls 19 with each other, and second flange portions 21 separately protruding, to the outside in the front-rear direction X, from the upper ends of the pair of second side walls 19. The bottom wall 20 is provided with a first fitting recess portion 22 into which a lower end portion of the elastic body 13 is fitted.

The first flange portions 18 and the second flange portions 21 are stacked in the up-down direction Z and connected to form the first mounting member 11.

Figure 2:
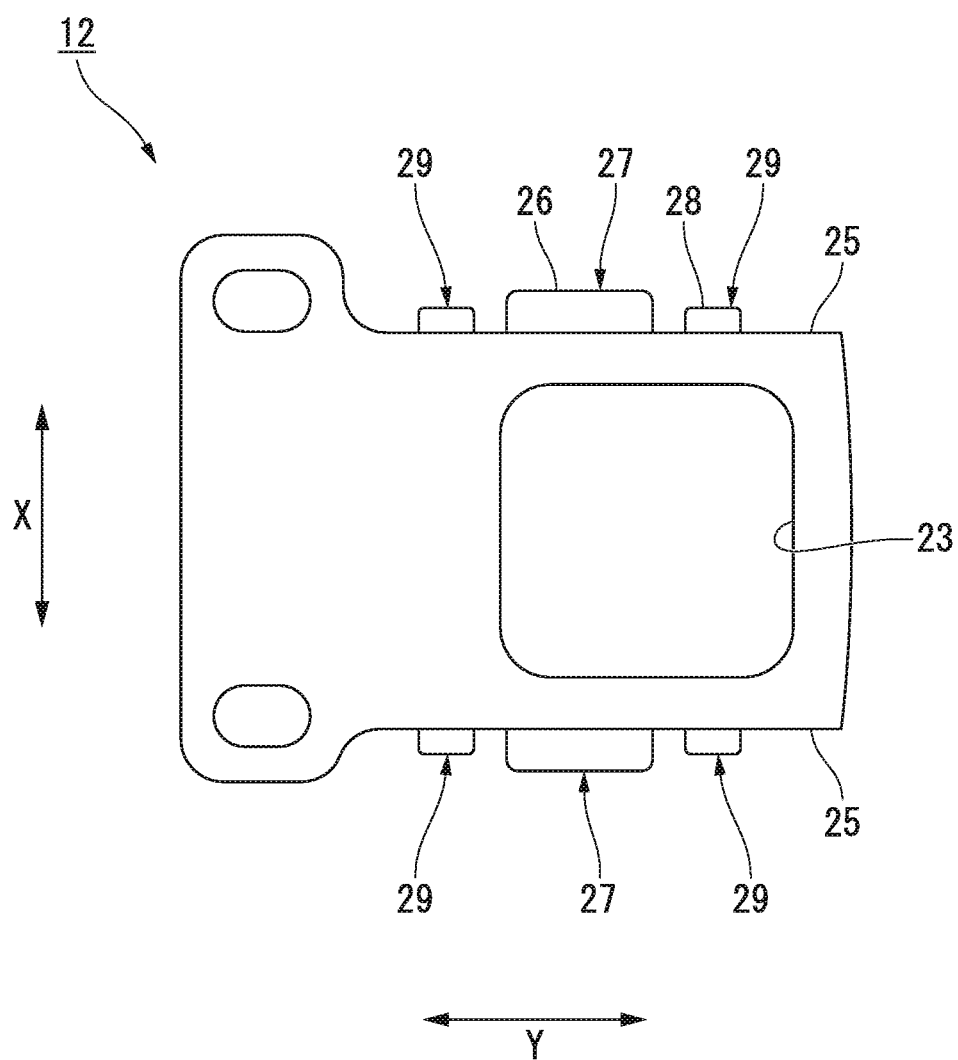
FIG. 2 is a bottom view of a second mounting member constituting the vibration isolation device shown in FIG. 1.

As shown in FIG. 1 and FIG. 2, the second mounting member 12 is formed in the shape of a plate. The obverse and reverse surfaces of the second mounting member 12 extend in both the front-rear direction X and the left-right direction Y, and in other words, are orthogonal to the up-down direction Z. One end portion of the second mounting member 12 in the left-right direction Y protrudes to the outside of the first mounting member 11, and the end portions, in the front-rear direction X, of this one end portion are connected to the vibration generating portion or the vibration receiving portion. A second fitting recess portion 23, into which the upper end portion of the elastic body 13 is fitted, is formed on the lower surface of the second mounting member 12.

The elastic body 13 is formed in the shape of a block, from an elastic material such as, for example, rubber.

In the above configuration, an inner surface 24 (opposing surface) of a first side wall 16 of the first mounting member 11 and an end surface 25 (opposing surface) that faces in the front-rear direction X, among the surfaces of the second mounting member 12, oppose each other in the front-rear direction X (opposition direction).

Figure 3:
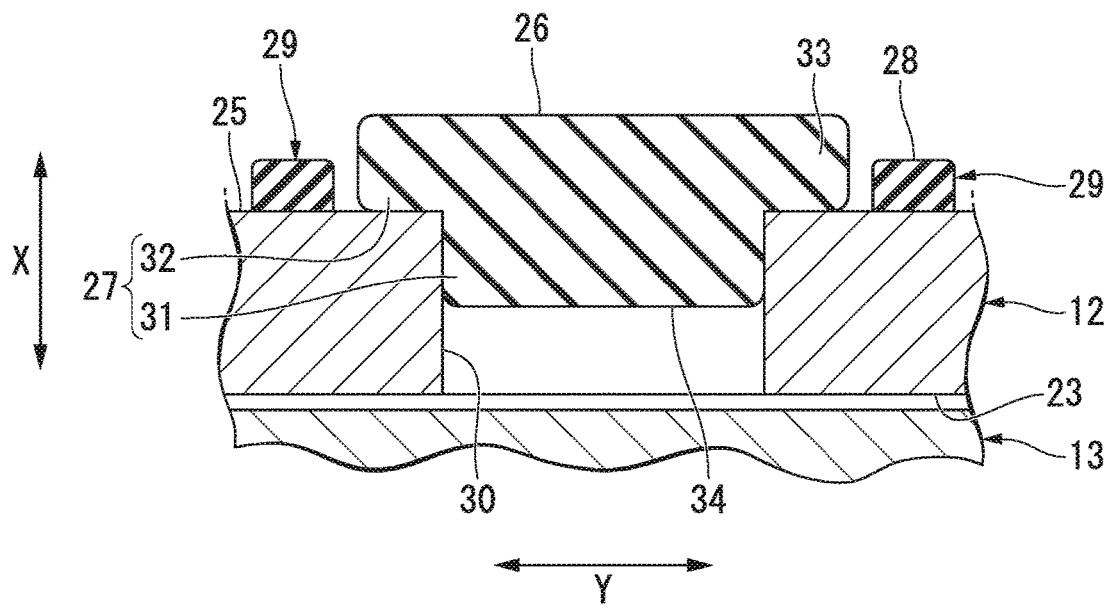
FIG. 3 is a section view of an essential portion of the vibration isolation device shown in FIG. 1.

As shown in FIG. 1 to FIG. 3, first stopper elastic bodies 27 and second stopper elastic bodies 29 are disposed on the end surfaces 25 of the second mounting member 12. The first stopper elastic bodies 27 have first stopper surfaces 26 that can come into contact with the inner surfaces 24 of the first side walls 16. The second stopper elastic bodies 29 have second stopper surfaces 28 that can come into contact with the inner surfaces 24 of the first side walls 16. The first stopper elastic bodies 27 and second stopper elastic bodies 29 are separately provided on both end surfaces 25 of the second mounting member 12. In other words, both of the end surfaces 25 of the second mounting member 12 are provided with a first stopper elastic body 27 and a second stopper elastic body 29.

The first stopper elastic bodies 27 and the second stopper elastic bodies 29 are provided in common on the end surfaces 25 of the second mounting member 12. In other words, both a first stopper elastic body 27 and a second stopper elastic body 29 are provided on each end surface 25 of the second mounting member 12. The first stopper elastic bodies 27 and the second stopper elastic bodies 29 are formed independently of each other, and are not integrated. The first stopper elastic bodies 27 and the second stopper elastic bodies 29 may, for example, be formed from the same material.

The distance between a first stopper surface 26 and the inner surface 24 of a first side wall 16 is smaller than the distance between a second stopper surface 28 and the inner surface 24 of the first side wall 16. In the present embodiment, the positions of the first stopper surface 26 and the second stopper surface 28 in the front-rear direction X are different from each other, and the first stopper surface 26 is positioned further outside than the second stopper surface 28 in the front-rear direction X. As a result, the distance between the first stopper surface 26 and the inner surface 24 of the first side wall 16 in the front-rear direction X is smaller than the distance between the second stopper surface 28 and the inner surface 24 of the first side wall 16 in the front-rear direction X.

A hollow portion 30, in which a first stopper elastic body 27 is disposed, is formed on the end surface 25 of the second mounting member 12. The hollow portion 30 is a through hole that opens in both directions in the front-rear direction X. In the hollow portion 30, the opening portion that is positioned to the inside in the front-rear direction X opens onto the inside of the second fitting recess portion 23 of the second mounting member 12.

The first stopper elastic bodies 27 are vulcanization-bonded to the second mounting member 12. The first stopper elastic bodies 27 comprise a fitted portion 31 that is positioned on the inside in the front-rear direction X and that is fitted inside a hollow portion 30, and a protrusion portion 32 that is positioned on the outside in the front-rear direction X and that protrudes to the outside, in the front-rear direction X, from the hollow portion 30. The fitted portion 31 is vulcanization-bonded to the inner circumferential surface of the hollow portion 30. The protrusion portion 32 is formed so as to have a larger diameter than the fitted portion 31, and the outer circumferential portion of the protrusion portion 32 is vulcanization-bonded to the end surface 25 of the second mounting member 12. The outer circumferential portion of the protrusion portion 32 forms an engagement portion 33 that is engaged with the peripheral portions of the opening of the hollow portion 30 on the end surface 25 of the second mounting member 12.

The first stopper surface 26 is a flat surface along both the up-down direction Z and the left-right direction Y. The first stopper surface 26 extends in directions orthogonal to the front-rear direction X. Among the surfaces of the first stopper elastic body 27, a counter-stopper surface 34, which faces the direction opposed to the first stopper surface 26, is also a flat surface along both the up-down direction Z and the left-right direction Y, and extends in the directions orthogonal to the front-rear direction X.

The first stopper elastic body 27 is fitted into the hollow portion 30 such that the counter-stopper surface 34 is in a non-contact state. The counter-stopper surface 34 is not in contact with the inner surfaces of the hollow portion 30, and is exposed to the inside of the second fitting recess portion 23 through the opening portion on the inside, in the front-rear direction X, of the hollow portion 30. The first stopper elastic body 27 is disposed so that the counter-stopper surface 34 faces the elastic body 13 through the hollow portion 30 so as to be able to come into contact therewith.

Second stopper elastic bodies 29 are arranged separately on both sides of the first stopper elastic body 27 in the left-right direction Y, on an end surface 25 of the second mounting member 12. The volume of the first stopper elastic body 27 is greater than the total volume of the pair of second stopper bodies 29.

Next, the actions of the vibration isolation device 10 will be explained.

When a vibration isolation device 10 is mounted on an automobile, the second mounting member 12 is connected to an engine, which is a vibration generating portion, and the first mounting member 11 is connected to a vehicle body, which is a vibration receiving portion, so as to suppress the transmission of engine vibrations to the vehicle body. At this time, the vibration isolation device 10 is mounted to the automobile so that the up-down direction Z in the vibration isolation device 10 is aligned with the vertical direction, and the front-rear direction X in the vibration isolation device 10 is aligned with the front-rear direction of the vehicle body.

When a load (vibration) is applied to the vibration isolation device 10 from the front-rear direction X, the first and second mounting members 11 and 12 move relative to each other in the front-rear direction X, and one of the end surfaces 25 of the second mounting member 12 in the front-rear direction X approaches the inner surface 24 of the first side wall 16 of the first mounting member 11 facing this end surface 25. Then, the first stopper surface 26 of the first stopper elastic body 27 provided on this end surface 25 of the second mounting member 12 comes into contact with the inner surface 24 of the first side wall 16, and the first stopper elastic body 27 restricts the relative movement between the mounting members 11 and 12.

When an even larger load is applied in the front-rear direction X, the second stopper surface 28 and the inner surface 24 of the first side wall 16 come into contact while the first stopper elastic body 27 is compressively deformed in the front-rear direction X by the inner surface 24 of the first side wall 16, thereby causing the first and second stopper elastic bodies 27 and 29 to restrict the relative movement of the mounting members 11 and 12.

As explained above, when a small load is applied, the first stopper elastic body 27 alone restricts the relative movement between the mounting members 11 and 12, and when a large load is applied, the relative movement between the mounting members 11 and 12 is restricted by both the first and second stopper elastic bodies 27 and 29. As a result, a large applied load can be received not only by the first stopper elastic body 27, but also by the second stopper elastic bodies 29, thus suppressing the burden placed on the first and second stopper elastic bodies 27 and 29, and allowing the durability of the vibration isolation device 10 to be improved.

Figure 4:
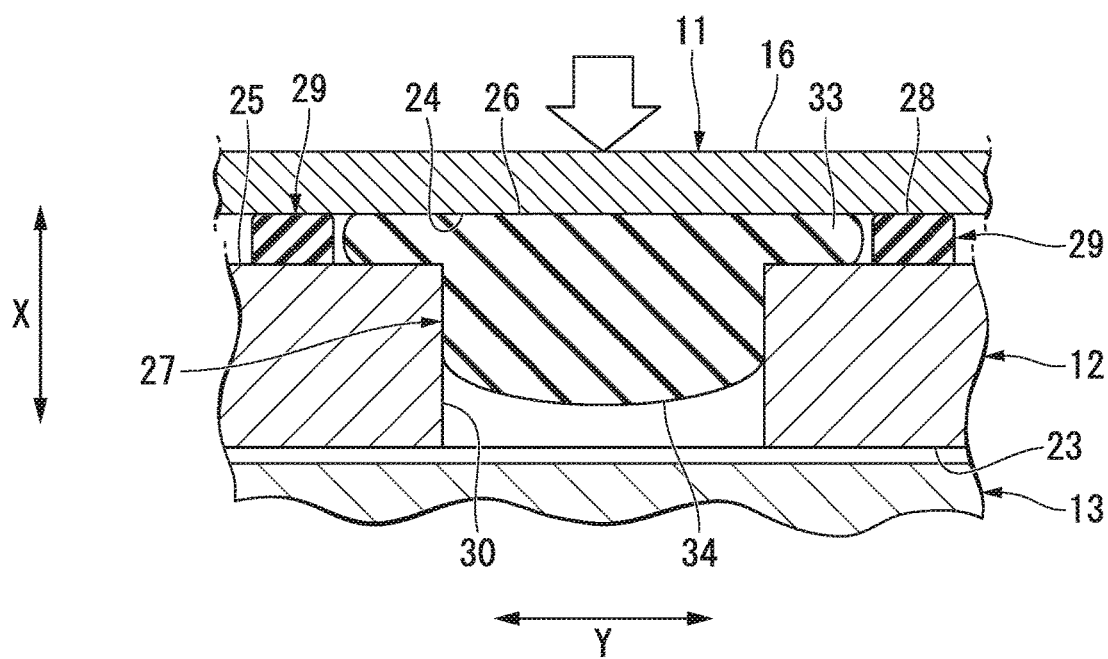
FIG. 4 is a section view of an essential portion of the vibration isolation device shown in FIG. 1, showing a state wherein vibrations are applied in a front-rear direction.

A first stopper elastic body 27 is fitted inside a hollow portion 30 such that the counter-stopper surface 34 is in a non-contact state. Therefore, as shown in FIG. 4, when a compressive load is applied to the first stopper elastic body 27 in the front-rear direction X, the first stopper elastic body 27 can be deformed so that the counter-stopper surface 34 expands in the front-rear direction X. Furthermore, in the present embodiment, the first stopper elastic body 27 is arranged in the hollow portion 30 such that the counter-stopper surface 34 is capable of coming into contact with the elastic body 13 through the hollow portion 30. Thus, the counter-stopper surface 34, upon expanding as mentioned above, is made to come into contact with the elastic body 13, thereby restricting further expansion of the counter-stopper surface 34.

As explained above, with the vibration isolation device 10 according to the present embodiment, when a compressive load is applied to the first stopper elastic body 27 in the front-rear direction X, the first stopper elastic body 27 can be deformed so that the counter-stopper surface 34 expands in the front-rear direction X. Therefore, when the first stopper surface 26 comes into contact with the inner surface 24 of the first side wall 16 of the first mounting member 11, sudden increases in the spring constant in the front-rear direction X can be suppressed.

Additionally, since the hollow portion 30 is a through hole that opens in both directions in the front-rear direction X, the first stopper elastic body 27 can be reliably deformed so that the counter-stopper surface 34 expands in the front-rear direction X when a compressive load is applied to the first stopper elastic body 27 in the front-rear direction X.

Additionally, since the first stopper elastic body 27 is arranged in the hollow portion 30 such that the counter-stopper surface 34 faces the elastic body 13 and is capable of coming into contact therewith through the hollow portion 30, the counter-stopper surface 34, upon expanding as mentioned above, is made to come into contact with the elastic body 13, thereby restricting further expansion of the counter-stopper surface 34. Therefore, when a load is applied to the vibration isolation device 10 in the front-rear direction X, relative movement between the mounting members 11 and 12 can be reliably restricted while suppressing sudden increases in the spring constant.

Additionally, since an engagement portion 33 is provided on the first stopper elastic body 27, the first stopper elastic body 27 can be reliably restricted from coming loose from the hollow portion 30 when a compressive load is applied to the first stopper elastic body 27 in the front-rear direction X.

The technical scope of the present invention is not to be construed as being limited to the foregoing embodiments, and various modifications may be added within a range not departing from the gist of the present invention.

Figure 5:
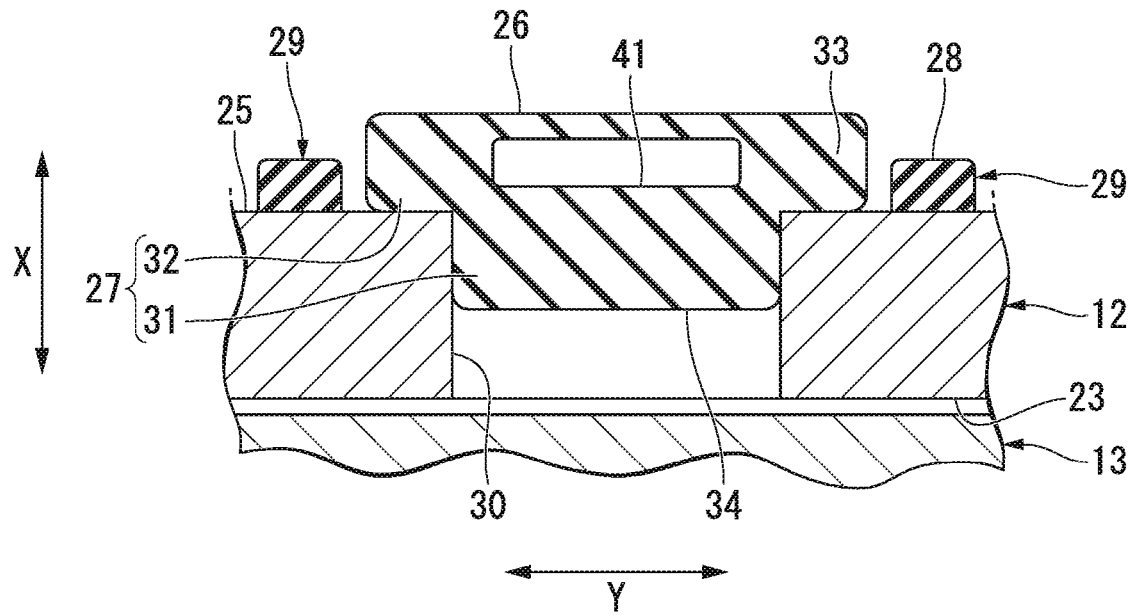
FIG. 5 is a section view of an essential portion of the vibration isolation device according to a first modification example of the present invention.
Figure 6:
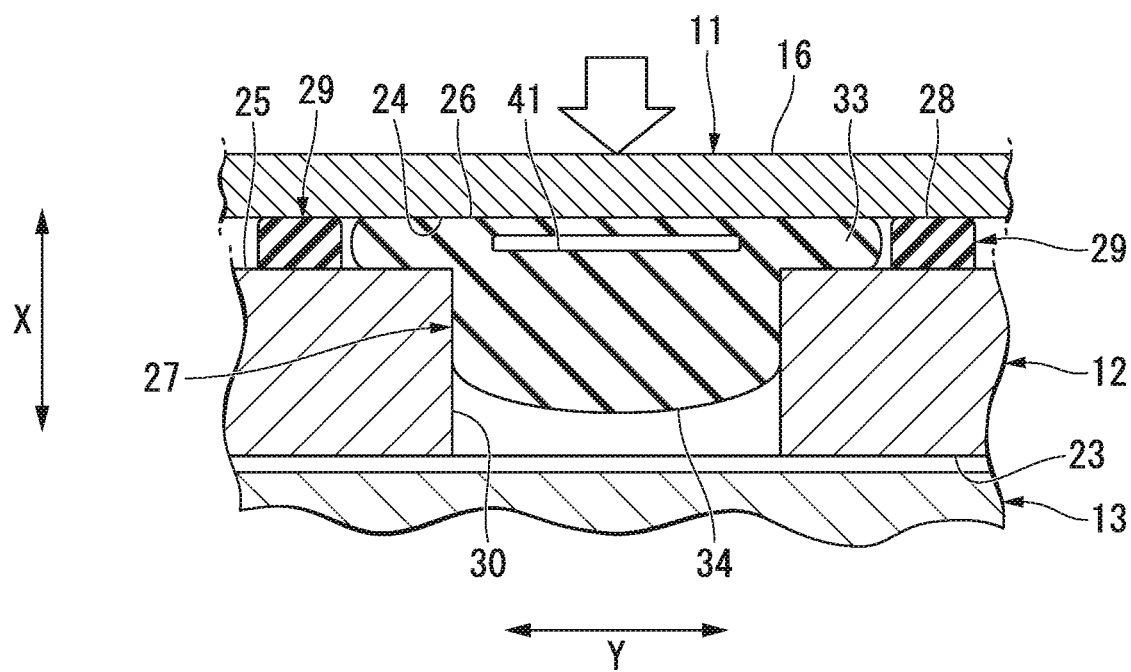
FIG. 6 is a section view of an essential portion of the vibration isolation device shown in FIG. 5, showing a state wherein vibrations are applied in a front-rear direction.
Figure 9:
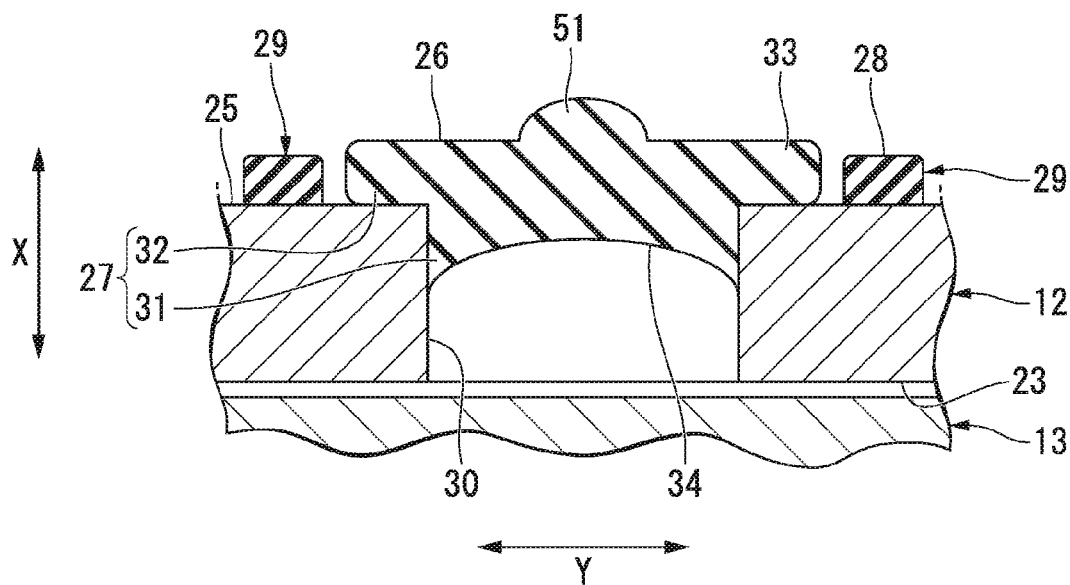
FIG. 9 is a section view of an essential portion of the vibration isolation device according to a third modification example of the present invention.
Figure 10:
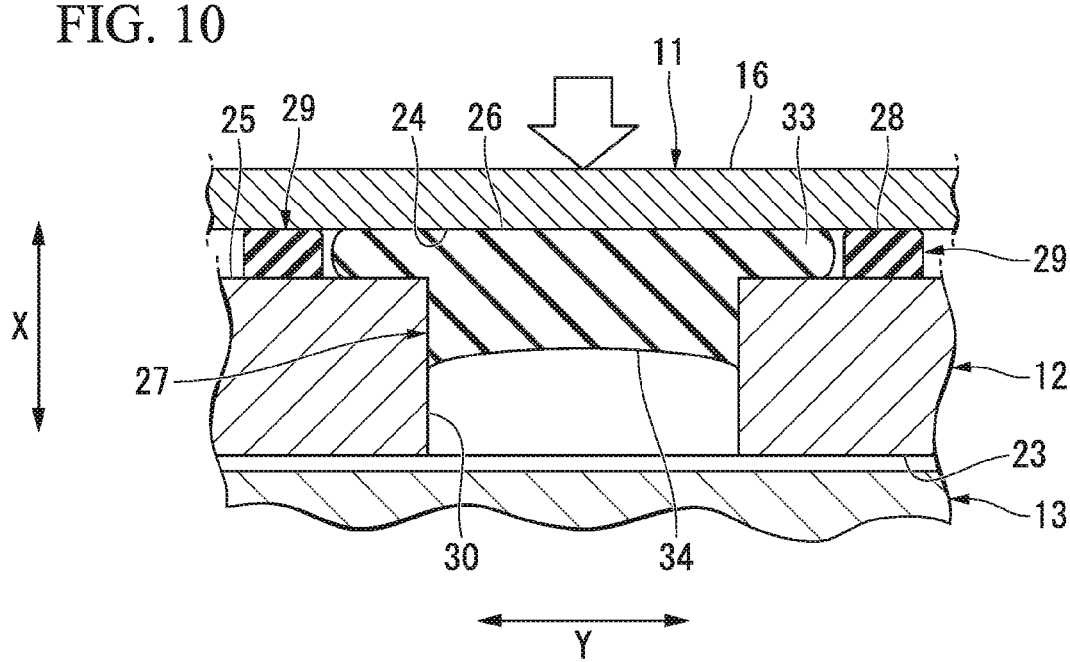
FIG. 10 is a section view of an essential portion of the vibration isolation device shown in FIG. 9, showing a state wherein vibrations are applied in a front-rear direction.

For example, a cavity portion 41 may be formed in the first stopper elastic body 27, as shown in FIG. 5 and FIG. 6. In the illustrated example, the cavity portion 41 is formed on the end which is adjacent to the first stopper surface 26 of the first stopper elastic body 27. The cavity portion 41 is in the shape of a rectangle that is long in the left-right direction Y and short in the front-rear direction X, in a sectional view along both the front-rear direction X and the left-right direction Y.

Additionally, the first stopper surface 26 may be formed in a waved shape having alternately repeating expanded portions that are expanded in the front-rear direction X and depressed portions that are depressed in the front-rear direction X.

Additionally, the end which is adjacent to the first stopper surface 26 of the first elastic body 27 may be formed in the shape of a bellows so as to be able to easily deform in the front-rear direction X.

In these cases, it is possible to reliably suppress increases in the spring constant when the first stopper surface 26 comes into contact with the inner surface 24 of the first side wall 16 of the first mounting member 11 facing this first stopper surface 26.

As shown in FIG. 7 to FIG. 10, a protrusion part 51 may be provided on the first stopper surface 26 or the inner surface 24 of the first side wall 16 of the first mounting member 11 opposing this first stopper surface 26. This protrusion part 51 is provided on one of the first stopper surface 26 and the inner surface 24 of the first side wall 16, and projects towards the other. In the vibration isolation device shown in FIG. 7 and FIG. 8, the protrusion part 51 is provided on the inner surface 24 of the first inner wall 16, and in the vibration isolation device shown in FIG. 9 and FIG. 10, the protrusion part 51 is provided on the first stopper surface 26.

In these cases as well, it is possible to reliably suppress increases in the spring constant when the first stopper surface 26 comes into contact with the inner surface 24 of the first side wall 16 of the first mounting member 11 opposing this first stopper surface 26.

In the present invention, the second stopper elastic bodies 29 may be absent.

In the aforementioned embodiment, the first mounting member 11 was formed in the shape of a rectangle when viewed from the left-right direction Y, however, the present invention is not limited to such a configuration. For example, the first mounting member 11 may be in the form of a circle or an ellipse when viewed from the left-right direction Y.

Figure 11:
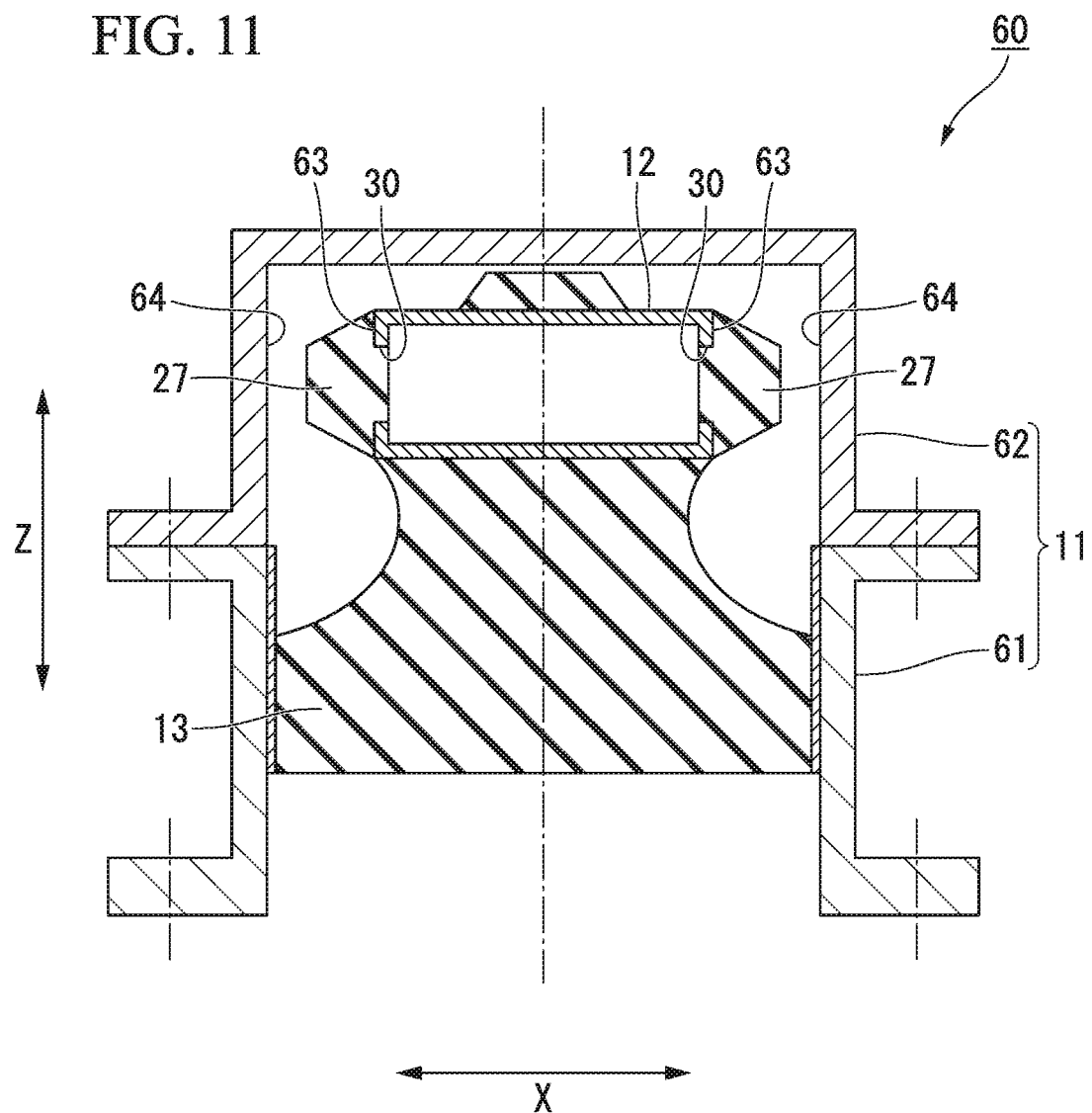
FIG. 11 is a section view of a vibration isolation device according to a fourth modification example of the present invention.

Additionally, as shown in FIG. 11, the shapes of the first mounting member 11, the second mounting member 12 and the elastic body 13 may be different.

In the vibration isolation device 60 shown in FIG. 11, the first mounting member 11 comprises a tubular portion 61 and a frame-shaped portion 62. The frame-shaped portion 62 is formed in an inverted U-shape in a front view, and is fixed to an end portion of an opening of the tubular portion 61. In this vibration isolation device 60, the axial direction of the tubular portion 61 is aligned with the up-down direction Z, and the direction in which the frame-shaped portion 62 opens is aligned with the left-right direction Y. In the up-down direction Z, the side having the frame-shaped portion 62 is the upper side, and the side having the tubular portion 61 is the lower side.

The second mounting member 12 is formed in the shape of a tube that opens in the left-right direction Y. The second mounting member 12 is formed in the shape of a rectangle when viewed from the left-right direction Y. In the second mounting member 12, when viewed from the left-right direction Y, a pair of wall portions that oppose each other extend in the up-down direction Z, and the other pair of wall portions extend in the front-rear direction X. In the second mounting member 12, the outer surfaces 63 (opposing surfaces) on the side wall portions, which are the pair of wall portions positioned in the front-rear direction X, oppose the inner surfaces 64 (opposing surfaces), facing in the front-rear direction X, of the frame-shaped portion 62.

The elastic body 13 is fixed separately to both the inner circumferential surface of the tubular portion 61 of the first mounting member 11 and the bottom surface of the second mounting member 12.

Additionally, the first stopper elastic body 27 and the hollow portion 30 are provided on the outer surface 63 of the side wall portion of the second mounting member 12.

In the aforementioned embodiment, the first stopper elastic body 27 and the hollow portion 30 are provided on the second mounting member 12, however, the present invention is not limited to such a configuration. For example, the first stopper elastic body 27 and the hollow portion 30 may be provided on the first mounting member 11.

In the present invention, the first stopper elastic bodies 27 may be absent. In that case, it is possible to use a configuration wherein the second stopper elastic bodies 29 are fitted within the hollow portions such that, among the surfaces of the second stopper elastic body 29, the counter-stopper surfaces facing the direction opposed to the second stopper surfaces 28 are in a non-contact state.

Additionally, in the present invention, it is possible to provide both first stopper elastic bodies 27 and second stopper elastic bodies 29, and to allow the counter-stopper surfaces 34 of both stopper elastic bodies 27 and 29 to be in a state of non-contact with the inner surfaces of the hollow portions 30.

The engagement portions 33 may be absent.

Additionally, it is possible for the hollow portions 30 to not be through holes, and to not open towards the inside in the front-rear direction X.

In the aforementioned embodiment, the second mounting member 12 is connected to an engine and the first mounting member 11 is connected to a vehicle body, however, they may be connected in the inverted manner.

Furthermore, the vibration isolation device 10 according to the present invention is not limited to application to an engine mount of a vehicle, and may be applied to devices other than engine mounts. For example, it may be applied to a generator mount provided in construction machinery, or to a mount for machinery installed in a factory or the like.

In addition thereto, it is possible to appropriately replace elements in the aforementioned embodiment with well-known elements, or to appropriately combine the aforementioned modification examples, within a range not departing from the gist of the present invention.

INDUSTRIAL APPLICABILITY

In a vibration isolation device, sudden increases in the spring constant can be suppressed.

REFERENCE SIGNS LIST 10, 60 Vibration isolation device
11 First mounting member
12 Second mounting member
13 Elastic body
24 Inner surface (opposing surface)
25 End surface (opposing surface)
26 First stopper surface
27 First stopper elastic body
28 Second stopper surface
29 Second stopper elastic body
30 Hollow portion
33 Engagement portion
34 Counter-stopper surface
63 Outer surface (opposing surface)

64 Inner surface (opposing surface)

X Front-rear direction (opposition direction)

The invention claimed is:

1. A vibration isolation device comprising:
a first mounting member connected to one of a vibration generating portion and a vibration receiving portion, and a second mounting member connected to the other thereof; and
an elastic body disposed between the mounting members;
wherein, on either one of opposing surfaces that oppose each other, respectively on the first mounting member and the second mounting member, a stopper elastic body having a stopper surface which faces the other of the opposing surfaces such as to be capable of coming into contact therewith, and a hollow portion in which the stopper elastic body is disposed, are provided,
wherein the stopper elastic body is fitted into the hollow portion such that, among the surfaces of the stopper elastic body, a counter-stopper surface which faces the direction opposed to the stopper surface, is in a state of non-contact, and
wherein the counter-stopper surface faces the elastic body through the hollow portion so as to be able to come into contact with the elastic body.

2. The vibration isolation device according to claim 1, wherein the hollow portion is a through hole that opens in both directions in the opposition direction in which the opposing surfaces oppose each other.

3. The vibration isolation device according to claim 2, wherein the stopper elastic body is arranged such that the counter-stopper surface faces the elastic body and is capable of coming into contact therewith.

4. The vibration isolation device according to claim 1, wherein the stopper elastic body is provided with an engagement portion that engages with a peripheral portion of an opening of the hollow portion on the opposing surface on which the stopper elastic body is disposed.

5. A vibration isolation device comprising:
a first mounting member connected to one of a vibration generating portion and a vibration receiving portion, and a second mounting member connected to the other thereof; and
an elastic body disposed between the mounting members;
wherein, on either one of opposing surfaces that oppose each other, respectively on the first mounting member and the second mounting member, a stopper elastic body having a stopper surface which faces the other of the opposing surfaces such as to be capable of coming into contact therewith, and a hollow portion in which the stopper elastic body is disposed, are provided,
wherein the stopper elastic body is fitted into the hollow portion such that, among the surfaces of the stopper elastic body, a counter-stopper surface which faces the direction opposed to the stopper surface, is in a state of non-contact, and
wherein the stopper elastic body protrudes from the second mounting member in a first direction that crosses a second direction in which the first mounting member and the second mounting member sandwich the elastic body.

6. The vibration isolation device according to claim 5, wherein
the second mounting member includes a recess extending, in a direction opposite the second direction, into the second mounting member from an outer surface of the second mounting member,
the elastic body protrudes from the recess of the second mounting member in the second direction, and
the hollow portion communicates with the recess in a direction opposite the first direction, and the stopper elastic body extends into the hollow portion in the direction opposite the first direction.

* * * * *